US011637881B2

United States Patent
Yousef et al.

(10) Patent No.: US 11,637,881 B2
(45) Date of Patent: Apr. 25, 2023

(54) METHOD FOR PLAYING ON A PLAYER OF A CLIENT DEVICE A CONTENT STREAMED IN A NETWORK

(71) Applicant: STREAMROOT, Paris (FR)

(72) Inventors: Hiba Yousef, Paris (FR); Alexandre Storelli, Paris (FR)

(73) Assignee: Streamroot, Paris (FR)

( * ) Notice: Subject to any disclaimer, the term of this patent is extended or adjusted under 35 U.S.C. 154(b) by 0 days.

(21) Appl. No.: 17/371,014

(22) Filed: Jul. 8, 2021

(65) Prior Publication Data

US 2022/0337643 A1 Oct. 20, 2022

(30) Foreign Application Priority Data

Apr. 20, 2021 (EP) .................................... 21305519

(51) Int. Cl.
| | | |
|---|---|---|
| *H04L 65/612* | (2022.01) | |
| *H04L 65/75* | (2022.01) | |
| *H04L 65/80* | (2022.01) | |
| *H04L 67/1025* | (2022.01) | |
| *H04L 67/1061* | (2022.01) | |

(52) U.S. Cl.
CPC .......... *H04L 65/612* (2022.05); *H04L 65/764* (2022.05); *H04L 65/80* (2013.01); *H04L 67/1025* (2013.01); *H04L 67/1061* (2013.01)

(58) Field of Classification Search
CPC ..... H04L 65/604; H04L 65/80; H04L 65/804; H04L 67/1025; H04L 67/1061
See application file for complete search history.

(56) References Cited

U.S. PATENT DOCUMENTS

| | | | | |
|---|---|---|---|---|
| 11,019,127 | B1 * | 5/2021 | Nann | ...................... H04L 65/60 |
| 11,089,347 | B2 * | 8/2021 | Mueller | .................. H04L 12/28 |
| 2013/0275615 | A1 * | 10/2013 | Oyman | ............... H04L 63/0815 |
| | | | | 709/231 |
| 2013/0332623 | A1 * | 12/2013 | Gahm | ................... H04L 65/752 |
| | | | | 709/234 |
| 2014/0032849 | A1 * | 1/2014 | De Vleeschauwer | ....................... |
| | | | | G06F 12/0862 |
| | | | | 711/133 |
| 2014/0210950 | A1 * | 7/2014 | Atanassov | ............. G01B 11/02 |
| | | | | 348/47 |
| 2014/0281000 | A1 | 9/2014 | Dattagupta | |
| 2019/0312797 | A1 | 10/2019 | Sen | |

(Continued)

FOREIGN PATENT DOCUMENTS

CN 107154918 11/2019

OTHER PUBLICATIONS

Extended European Search Report, dated Nov. 15, 2021, Application No. 21305519.7, filed Apr. 20, 2021, 33 pgs.

(Continued)

*Primary Examiner* — Dhairya A Patel

(57) ABSTRACT

The present invention relates to a method for playing on a player of a client device a content streamed in a network, including:
(a) receiving from the player a request for a current segment at a first quality level;
(b) determining, using a closed loop controller minimizing a difference between a first quality level and a setpoint second quality level, an optimal response delay for providing the requested current segment; and
(c) providing the requested current segment from a first buffer at the expiration of said estimated optimal response delay.

12 Claims, 3 Drawing Sheets

(56) References Cited

U.S. PATENT DOCUMENTS

| | | | | |
|---|---|---|---|---|
| 2020/0106822 A1* | 4/2020 | Roncero Izquierdo | ....................... | |
| | | | | H04L 65/764 |
| 2020/0133207 A1* | 4/2020 | Zeng | ...................... | G05B 11/42 |
| 2020/0351317 A1 | 11/2020 | Yousef | | |
| 2021/0306705 A1* | 9/2021 | Yousef | ................. | H04N 21/632 |
| 2021/0329057 A1* | 10/2021 | Wang | .................... | H04W 4/029 |
| 2023/0064187 | * 3/2023 | Gupta | ..................... | H04L 47/39 |

OTHER PUBLICATIONS

International Search Report and Written Opinion of the International Searching Authority, dated Aug. 19, 2022, Int'l Appl. No. PCT/EP22/060311, Int'l Filing Date Apr. 19, 2022, 39 pgs.

\* cited by examiner

METHOD FOR PLAYING ON A PLAYER OF A CLIENT DEVICE A CONTENT STREAMED IN A NETWORK

CROSS-REFERENCE TO RELATED APPLICATION(S)

This application claims priority to, and the benefit of, European patent application number 21305519.7, filed on Apr. 20, 2021, the entire content of which is hereby incorporated by reference.

FIELD OF THE INVENTION

The present invention relates to a method for playing a content streamed for example in a peer-to-peer network.

BACKGROUND OF THE INVENTION

"Streaming" designates a "direct" audio or video stream playing technique, that is while it is recovered from the Internet by a client device. Thus, it is in contrast with downloading, which requires to recover all the data of the audio or video content before being able to play it.

In the case of streaming, storing the content is temporary and partial, since data is continuously downloaded in a buffer of the client (typically the random access memory), analyzed on the fly by its processor and quickly transferred to an output interface (a screen and/or loudspeakers) and then replaced with new data.

Traditionally, the content is provided by streaming servers (referred to as a content delivery network, or CDN). The client which desires to access the content sends a request to recover first segments therefrom (by segment, it is intended a data block of the content, corresponding generally to a few seconds of playing). When there is sufficient data in the buffer to enable the beginning of the content to be played, playing starts. In the background, the stream downloading continues in order to uninterruptedly supply the buffer with the remaining part of the content.

However, it is noticed that this approach has limits if a great number of clients desire to play the same content simultaneously: the server is found to be saturated, being incapable of providing the content at a sufficient rate for playing to be fluid, and jerks occur.

Recently, an alternative strategy based on "peer-to-peer" (P2P) has been suggested, in which each client acts as a server for other clients: they are called peers. A peer which has started playing the content can forward to others segments it has already received, and so on, hence, easier broadcasting regardless of the number of clients being interested. This strategy is described in the international application WO 2012/154287.

However, most players implement what is known as Adaptive BitRate (ABR) and this proves to be problematic when combined with P2P.

The general idea of the ABR is to allow the automatic variation of the quality of the recovered segments according to the "capacities" of a peer. More precisely, each segment is available at several quality levels corresponding to several bitrates, i.e. data rates. It is indeed to be understood that a segment of better quality has better resolution, more frames per second, etc., and is consequently larger than the same segment in lower quality, therefore, it is necessary to support a higher data rate.

During ABR streaming, for each segment an algorithm automatically determines according to a given logic (referred to as "ABR logic") the best quality that can be chosen, generally in view of two criteria which are the observed bandwidth and/or the buffer filling rate.

In the first case, if the algorithm judges that the estimated bandwidth is sufficient to support higher quality, then it will instruct the client to switch to this (or conversely to lower the quality if the bandwidth is too low). In the second case, the principle is to divide the buffer memory into different intervals, each interval corresponding to an increasingly higher quality as the filling of the buffer memory increases (or more and less if it decreases).

In both cases, even if the ABR algorithms have no fundamental incompatibility to be used in a P2P streaming context, the problem is that the ABR algorithms were designed to work in a simple streaming scenario, i.e. with all segments retrieved on request from the content server.

However, in practice, P2P streaming advantageously performs "pre-fetching" (or "pre-buffering"), by downloading P2P segments into a dedicated P2P cache before the player actually requests them. Indeed, the objective of P2P streaming is to request as little as possible (and as a last resort) from the original content server: a direct request from a segment to this server is only made if there is a risk that there are no more segments in the video buffer and that playback is interrupted ("re-buffering"), otherwise there is a maximum count on the P2P network.

We are thus left from the point of view of the player with extremely high apparent bandwidth since segments can be loaded into the buffer memory from the P2P cache a fraction of a second after they have been requested. In addition, the filling rate of the video buffer is artificially high.

This causes the ABR's uncontrolled decisions to increase the quality if the current quality is not the maximum quality, regardless of the actual network capacity, the quality that it may not necessarily be able to support.

To avoid unstable oscillations in the quality of the stream or even repeated interruptions of playing, and numerous and unnecessary requests to the content server (CDN), it has been astutely proposed in the applications FR1903195 and EP20305202 to introduce an artificial response delay before delivering a segment to the player to control the ABR algorithm, and how to choose the optimal response delay without having access to the ABR logic of the player, in particular using a machine learning-based model.

The application EP20306545 even proposes a universal, reliable and agnostic way of overriding any "slave" ABR algorithm with a "master" ABR logic in a P2P streaming context thanks to the response delay.

This solution is very satisfactory, and works well as long as we can reach the required "state" for the slave ABR logic to act as desired (buffer level, data reception rate, etc.) within the response delay, but the question is what if we can't?

For instance, if we are in the lowest buffer level (the ABR is selecting the lowest quality level), and we want the ABR to abruptly jump to the highest quality level, then we would need to fill the buffer with video segments till it reaches the highest buffer level, which is not doable with one segment only, as we need to fill the buffer with more segments to reach this high buffer level and select the high quality. So basically, the algorithm will fail in such transition phases.

It would, therefore, be desirable to have a more robust way of controlling any ABR algorithm in a P2P streaming context.

The present invention improves this situation.

SUMMARY OF THE INVENTION

For these purposes, the present invention provides according to a first aspect a method for playing on a player of a client device a content streamed in a network, said content consisting of a sequence of segments available in a plurality of quality levels, the player being configured so as to choose the quality level of the segments as a function of at least one parameter representative of a segment reception rate, according to an Adaptive BitRate, ABR, logic of the player; the client device comprising a first buffer for storing segments in a format adapted for transferring within the network, the method being characterized in that it comprises performing by a processing unit of the client device (11):

(a) receiving from the player a request for a current segment at a first quality level;
(b) determining, using a closed loop controller that minimizes a difference between said first quality level and a setpoint second quality level, an optimal response delay for providing the requested current segment.
(c) providing the requested current segment from the first buffer at the expiration of said estimated optimal response delay.

Preferred but non limiting features of the present invention are as it follows:

The client device further comprises a second buffer for storing segments in a format adapted for being played by the player, said current segment being provided at step (c) to said second buffer.

Said parameter representative of a segment reception rate is chosen among a buffer level of the first buffer and/or of the second buffer and a bandwidth.

Said closed-loop controller presents a plurality of gain parameters, the method comprising a previous step (a0) of tuning said gain parameters.

Said closed-loop controller is a proportional-integral-derivative controller having three gain parameters.

The network comprises a peer-to-peer network of client devices, step (a) comprising determining, as a function of at least one parameter representative of a capacity of said peer-to-peer network, said second quality level.

Said parameter representative of a capacity of said peer-to-peer network is chosen among a transfer speed of the peer-to-peer network, a segment availability, a rate of segment fetching, and a stability of the client devices.

Said method is iteratively performed for said sequence of segments, said closed loop controller being continuously working.

Said optimal response delay is such that providing the requested current segment at the expiration of said optimal response delay will cause the player to flawlessly request according to its ABR logic a next segment at a third quality level close to said second quality level.

The method comprises before step (c), if said next segment is not present at said third quality level in the first buffer, fetching said next segment at said third quality level from the network.

According to a second aspect, the invention provides a device for playing on a player a content streamed in a network, said content consisting of a sequence of segments available in a plurality of quality levels, the player being configured so as to choose the quality level of the segments as a function of at least one parameter representative of a segment reception rate, according to an Adaptive BitRate, ABR, logic of the player; the client device comprising a first buffer for storing segments in a format adapted for transferring within the network, the client device being characterized in that it comprises a processing unit implementing:

(a) receiving from the player a request for a current segment at a first quality level;
(b) determining, using a closed loop controller minimizing a difference between said first quality level and a setpoint second quality level, an optimal response delay for providing the requested current segment.
(c) providing the requested current segment from the first buffer at the expiration of said estimated optimal response delay.

According to a third and a fourth aspect the invention provides a computer program product comprising code instructions to execute a method according to the first aspect for playing on a player of a client device a content streamed in a network; and a computer-readable medium, on which is stored a computer program product comprising code instructions for executing a method according to the first aspect for playing on a player of a client device a content streamed in a network.

BRIEF DESCRIPTION OF THE DRAWINGS

The above and other objects, features and advantages of this invention will be apparent in the following detailed description of an illustrative embodiment thereof, which is to be read in connection with the accompanying drawings wherein.

DETAILED DESCRIPTION OF A PREFERRED EMBODIMENT

Architecture

Figure 1:
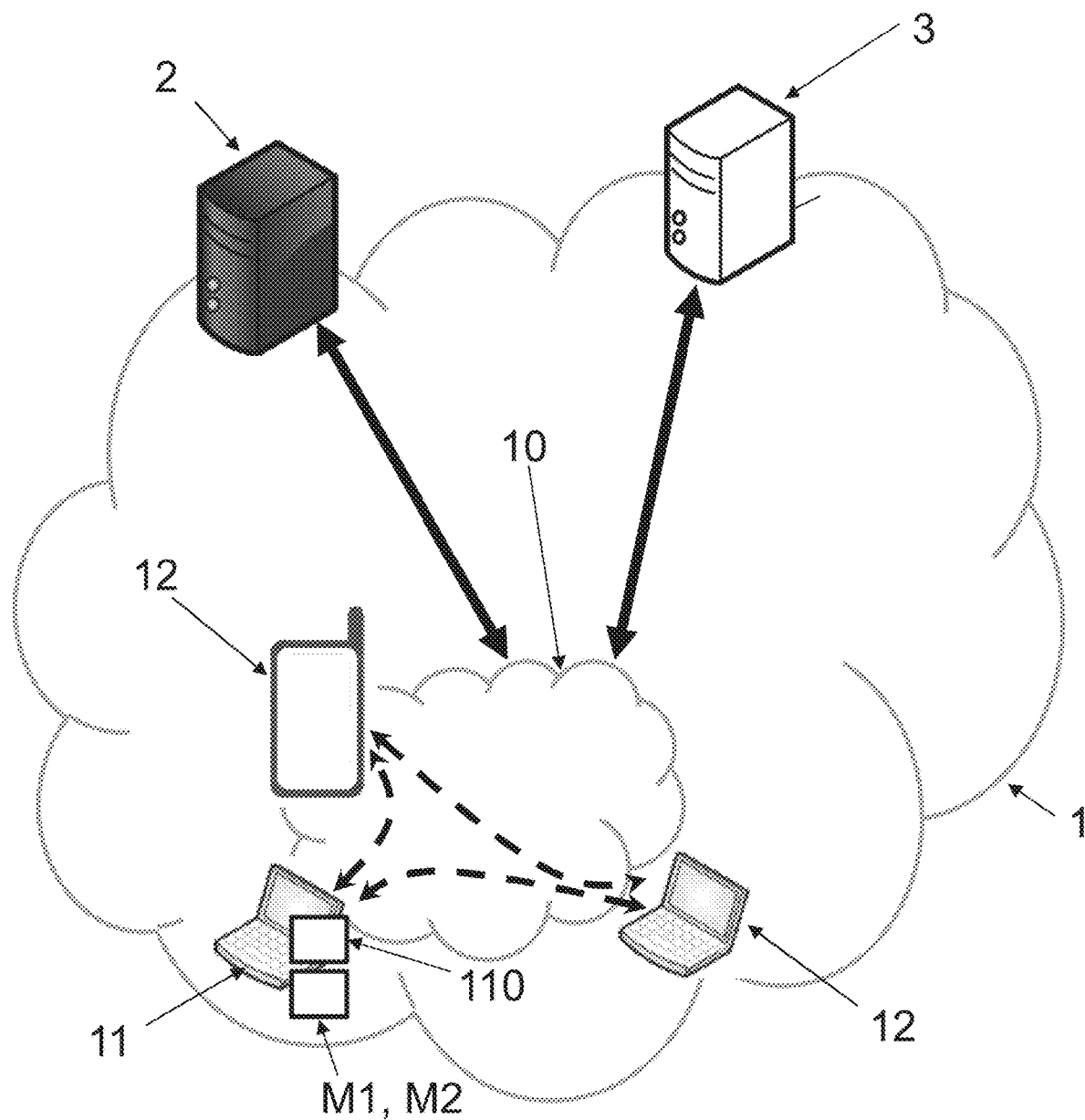
FIG. 1 represents an architecture for implementing the method according to the invention.

In reference to FIG. 1, the invention relates to a method for playing a content streamed within a network 1 (advantageously within a peer-to-peer network 10 of client device 11, 12) using a closed loop controller, with gain parameters advantageously tuned according to a dedicated tuning method.

Network 1 is herein a large scale telecommunications network and in particular the Internet. This network 1 comprises the peer-to-peer network 10 of client devices 11, 12. Each client device 11, 12 is typically a personal computing device such as a smartphone, a PC, a tablet, etc. connected to the network 1, having a data processing unit 110 such as a processor, an interface for playing the content, and a storage unit such as a random access memory and/or a mass memory.

Playback is implemented by a player, that is to say an application executed by the data processing unit 110, which can be of a varied nature, for example a dedicated application, an internet browser in particular HTML5 compatible, an operating system module, etc. Note that the player may be defined by a name and a version.

We will assume in the following description that the player is "as is", i.e. not modified for the implementation of this process, or even for P2P streaming. In particular, the player implements an adaptive bitrate (ABR) logic, in other words said content to be played consists of a sequence of segments available in a plurality of quality levels and the player is able to decide autonomously which quality level to request, in accordance with this ABR logic. The various quality levels correspond to different bitrates, that is to say a variable volume of data per unit of time (and thus per segment). We naturally understand that better quality content requires a higher bit rate.

More details will follow regarding the concept of ABR logic, it is only to be understood that in the context of the present method it is not necessary that the ABR logic is controllable or even known: the present method is completely universal and can be adapted to any player implementing any ABR logic on the basis of any criteria. It will be assumed that the ABR logic is predefined and that the client software (see below) only undergoes it.

Furthermore, the client device 11 (and more precisely its storage unit) has two memories M1 and M2, referred to as "buffers", typically two zones of a random access memory, each being able to store (in a different way as will be seen) all or part of the content temporarily (by temporarily, it is meant that the segments are deleted from this memory shortly after they have been played: they are not stored in the long term as is the case for a direct downloading). As will be seen later, in the preferred case of playing via a browser, all the segments are typically deleted (i.e. the buffers are reinitialized) at the latest when the browser or tab in which the video is played is closed.

The first buffer M1 is called "peer-to-peer cache". It stores segments under a so-called "raw" format. By raw segments, it is meant a format adapted for transferring within the network 1, in particular within the peer-to-peer network 10, but not adapted for playing on the device 11.

The second buffer M2 is called "video buffer". It stores segments under a so-called "converted" format. By converted segments, it is meant converted from the raw segments under a format adapted for playing on the device 11, but not adapted for transferring within the peer-to-peer network 10.

As explained in the introductory part, these devices 11, 12 are "peers" (also called "nodes") of the peer-to-peer network 10.

By "client devices 11, 12 of a peer-to-peer network 10", it is meant devices connected in the network 1 by a peer-to-peer network protocol. In other words, the data processing units for each peer implement a particular program (client software, referred to as "peer agent", PA), which can be integrated with the player (for example an extension of a web browser), be a dedicated application, or even be embedded into any other software (for example the operating system of an internet access box, or a multimedia box, i.e. a "Set-top box"), for using the peer-to-peer. The present method is mainly implemented via this client software. In the following description, it will be assumed that the client software is in communication with the player so as to provide it with segments, while operating independently. More precisely, we understand that the role of the player is the playing in itself, i.e. the rendering of the segments, while the role of the client software is simply obtaining the segments for the player, the client software undergoing the operation of the player, and in particular its ABR logic.

As explained, a peer-to-peer network, or P2P, is a decentralized sub-network within the network 1, wherein data can be directly transferred between two client devices 11, 12 of the peer-to-peer network 10, without passing through a central server. Thus, it enables all the client devices 11, 12, to play both the role of client and server. The peers 11, 12 are thus defined as "seeders" (or data suppliers) and/or "leechers" (or data receivers).

Said content, which is in particular an audio or video content, that is a media of some length, consists of a sequence of segments (called a "playlist") stored in data storage means of a server 2 connected to the peer-to-peer network 10. The segments have a predetermined length, typically one or two seconds of the content, but it can range from a fraction of a second to about ten seconds. All the segments of a given content have generally the same length.

The server 2 is a content server, advantageously present in network 1 and connected to the peer-to-peer network 10. In other words, this is one (or more) server(s) of the Internet network 1 providing the segments of various contents in accordance with a given streaming protocol. For example, the HLS ("HTTP Live Streaming") will be mentioned, in which segments are "ts" files, listed in a "m3u8" playlist file. HLS involves the MPEG2 or the fragmented MP4 format for the content. DASH, Smooth streaming, or HDS streaming protocols will also be mentioned. The raw segments may be shared between peers via a protocol of the WebRTC type.

The server 2 is the primary source of the segments, insofar as initially no peer has the content (before a first transfer of the server 2 to this peer 11, 12). The contents are either at the very beginning stored integrally on the server 2 (case of the VOD previously discussed), or generated in real time (case of the live streaming), and in the latter case, the list of segments making it up dynamically changes over time.

Live streaming proposes to broadcast in real time contents associated with "live" events, for example concerts, meetings, sports events, video games, etc., which are simultaneously happening. With respect to streaming of already integrally existing content as a film, a live streaming broadcast content is actually generated gradually as the associated event happens. Technically, as in the case of a live event on TV, such content can only be broadcast with some delay, which the user wishes to be as small as possible. This delay is typically in the order of one minute, but can go down to about twenty seconds. Thereby, a playlist of only a few segments (at most some tens) is available at each instant, the segments of this list being dynamically renewed in accordance with a turnover: as the event happens, new segments are created, "age", are received and played by clients (at the end of the expected delay), and finally exit the list.

In the latter case (live streaming), the content should rather be seen as a continuous stream. The sequence of segments is thereby dynamic, that is it is regularly updated. Each time a new segment is generated, it is added at the end of the sequence, and the first segment of the sequence (the oldest) is deleted. All the others are offset according to a turnover mechanism which can be related to a FIFO ("first in, first out") list. The first segment of the list (the oldest one) can be either a "live" or "past" segment. The "live" segment is the segment at the playing edge, and thus, the segments are deleted from the playlist as soon as they are played. The "past" segment exists when the content server 2 accepts that the content is played with some delay e.g. DVR (Digital Video Recorder) and other platforms that allow live streaming with up to a 2 h delay.

The present method may be implemented in any context.

The peer-to-peer network 10 is also connected to a peer management server 3 called a "tracker". The tracker 3 has data processing means and storage means. It coordinates exchanges between peers 11, 12 (by controlling the client software implemented by each of the client devices 11, 12), but it is not directly involved in data transfer and does not have a copy of the file.

As explained, a dedicated method for tuning gain parameters of the closed loop controller may be implemented, either by the processing unit 110 of a client device 11 (or of another client device 12) or directly by the peer management server 3.

ABR Logic

As already explained, the player of the client device 11 is configured so as to choose the quality level of the segments as a function of at least one parameter representative of a segment reception rate, according to an ABR logic of the player.

In any case, the ABR logic can be defined by means of a first function making it possible to calculate the quality level to be chosen (the bitrate) as a function of said at least one parameter representative of a reception rate of segments. More precisely, said first function is generally called by the player at each segment received, and the output is the quality level at which the next segment will be requested. Note that said output can be expressed in particular as an integer level number (for example between 1 and L, where 1 is the worst quality and L is the best quality or the opposite), or directly as a bitrate value (either a discrete value chosen among a possible bit rate values, or a continuous bitrate value). Said first function is supposed to be a "black box".

It is understood that said parameter representative of a segment reception rate is a monitored parameter, which can be any parameter illustrating the capacity of the device 11 and/or of the network 10 to receive the segments "fast enough". As mentioned, the known ABR logics generally use as a parameter a buffer level of the second buffer memory M2 (either in value, i.e. in seconds or in number of segments, or in rate) and/or a bandwidth (i.e. the data reception rate observed).

In other words, the player monitors the bandwidth and/or the buffer level, and consequently makes decisions as to whether or not to modify the quality level of the segments required.

Note that other parameters are sometimes taken into account, such as device capabilities (including the CPU/GPU load and decoding capabilities, available memory, screen size, etc.) and/or user geographical location.

Thus, there are three main classes of ABR logic:
The "BB" class, for buffer-based ABR logic;
The "RB" class, for rate-based ABR logic;
The "H" class, for hybrid (buffer-rate-based) ABR logic.

Note there might be further classes. The following specification will take the example of these three classes but the skilled person will understand that the present method is not limited to any set of possible ABR logic classes.

Segment Quality Level Controller

As explained in the introduction, previously proposed solutions were using a model predicting the ABR logic, i.e. approximating the above-mentioned first function defining the ABR logic, regardless of the actual class of the ABR logic (for instance trained using machine learning (ML) algorithms, see the application EP20305202).

The idea was, considering a target quality level, to estimate using said model predicting the ABR logic of the player an optimal response delay such that providing the requested current segment at the expiration of said optimal response delay will cause the player to request according to its ABR logic a next segment at said target quality level.

Despite the performance of this approach, the problem of the ML-model is that it is designed to deliver segment by segment, which will fail in "abrupt" transition phases. Indeed, the existence of said optimal response delay, that will cause the player to request according to its ABR logic a next segment at said target quality level, is not guaranteed.

Therefore, the present method astutely proposes to use a closed-loop controller instead, and in particular a proportional-integral-derivative (PID) controller, on the quality level. Note that any known closed-loop controller can be used, for instance filters, feedforward compensators, lead/lag compensators, etc.

A closed-loop controller, also called "feedback" controller, is widely used in industrial control systems and continuously calculates an error as the difference between a desired setpoint and a measured process variable and applies a correction (adjustment of a control variable) attempting to minimize the error over time by adjustment of a control variable. For a PID, said correction is based on proportional, integral, and derivative components (denoted P, I, and D respectively), hence the name, see FIG. 2 for general architecture of such controller. By opposition, an open-loop controller does not take into account the measured process value.

In the present case:
The measured process variable is the current quality level (referred to as first quality level);
The setpoint is the target quality level (referred to as second quality level);
The error is the difference between said first and second quality levels;
The control variable is the response delay.

In other words, the present closed loop controller minimizes a difference between the current first quality level and the setpoint second quality level.

The main goal of a closed-loop controller is to keep the error signal as close as possible to zero, without guaranteeing that zero will be reached. In other words, the closed-loop controller allows estimating an optimal response delay such that providing the requested current segment at the expiration of said optimal response delay will cause the player to flawlessly request according to its ABR logic a next segment at a third quality level as close as possible to said second quality level, i.e.:
either the player directly requests according to its ABR logic the next segment at said second quality level if it is possible (the third quality level is the same as the second quality level);
or said second quality level will be progressively reached (not at the first iteration: the third quality level is different from the second quality level).

It therefore prevents "impossible" transitions that will cause the algorithm to fail, by allowing instead "longer-than-one-segment" variations that the ML-model cannot handle. To rephrase again, the closed-loop controller guarantees that the algorithm will not fail ("flawlessly request") even if it is theoretically possible in some cases to reach the target more quickly. For example, it might be possible that the closed-loop controller reaches the second quality level in two-steps (i.e. segment 0 at the first quality level, segment 1 at an intermediate third quality level, and segment 2 at the desired second quality level) even if it would have been technically possible to have a direct transition thanks to the model, but without any risk of problem.

It is to be understood that said third quality level is the level at which the player actually requests the next segment, it is discovered at the next segment request by the player. In other words, the third quality level is not a prediction but a mere observation. Is it never decided nor computed by the closed loop controller, its only output is the optimal response delay.

Note that the present use of a closed-loop controller is unusual because it here works in a fully discrete system (instead of continuous time and state space).

Another advantage of using the controller instead of the ML-model is that there is nothing to learn. However, a closed-loop controller presents a plurality of gain parameters defining the accuracy and the behavior of the system, and they have to be tuned carefully.

Figure 2:
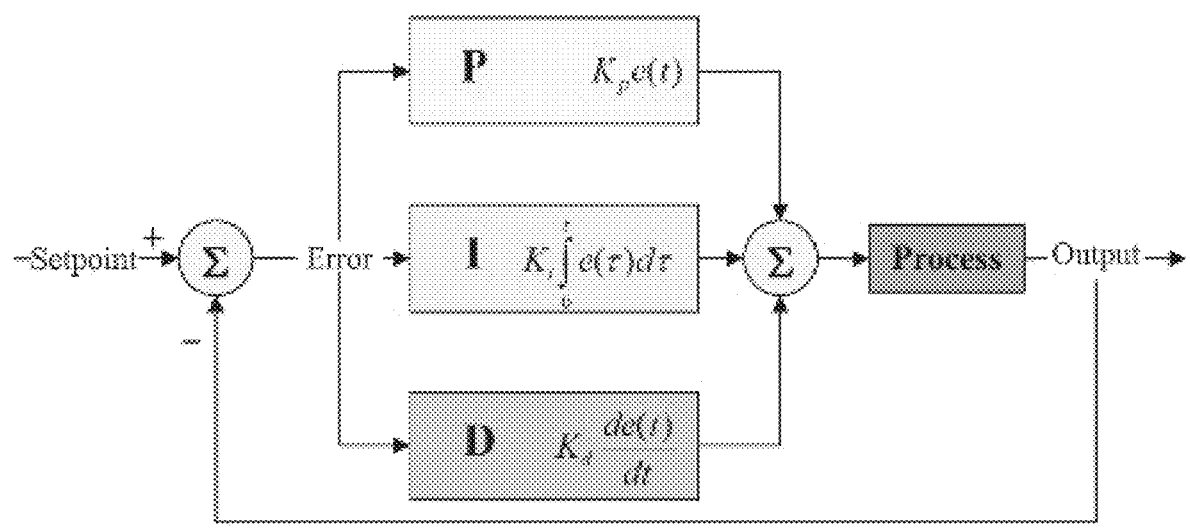
FIG. 2 represents the architecture of a PID controller.

In the preferred example of a PID, there are three gain parameters $K_P$, $K_I$ and $K_D$ corresponding to each component (see FIG. 2).

1. Proportional component (P-term): it tries to keep the current error at zero by multiplying error by $K_P$ and add it to the actuator. In other words, it amplifies the error proportionally; it helps to improve the reaction time, i.e. the amount of time (number of segments) to reach the second quality level. Increasing $K_P$ will lead to increasing the speed of the response, but it may lead to oscillations and vice versa.
2. Integral component (I-term): it tries to keep the history (not current) of errors at zero. It is used commonly to reduce the steady-state error (how many errors are accumulating over time). Due to the discrete values of the quality level (there are no small errors), said integral component is here advantageously be not used (set $K_I=0$)
3. Derivative component (D-term): it looks at the future of the errors, the rate of the change of the error. So if we have a fast rate of change then the output is going to change quickly, if we have a slow rate of change then the output is going to change slowly. Increasing the derivative gain can improve stability, reduce the oscillations (i.e. limiting unwanted quality switches), but it is going to cause some issues if there are noisy conditions.

Thus, the present method advantageously comprises an initial step (a0) of tuning said gain parameters. Note that any tuning method known to the skilled person such as Ziegler-Nichols, Tyreus Luyben, Cohen-Coon, Åström-Hägglund, or even manual tuning (set all gains to zero and progressively increase the gain parameters up to reach a suitable behavior) can be used.

Controlling the ABR

In the following description, we focus on client device 11 which is trying to retrieve the content from other devices 12 and/or the server 2, that is to say, the first buffer M1 already stores at least one raw segment, in at least one quality level, if possible a sub-sequence of the sequence constituting the content.

Figure 3:
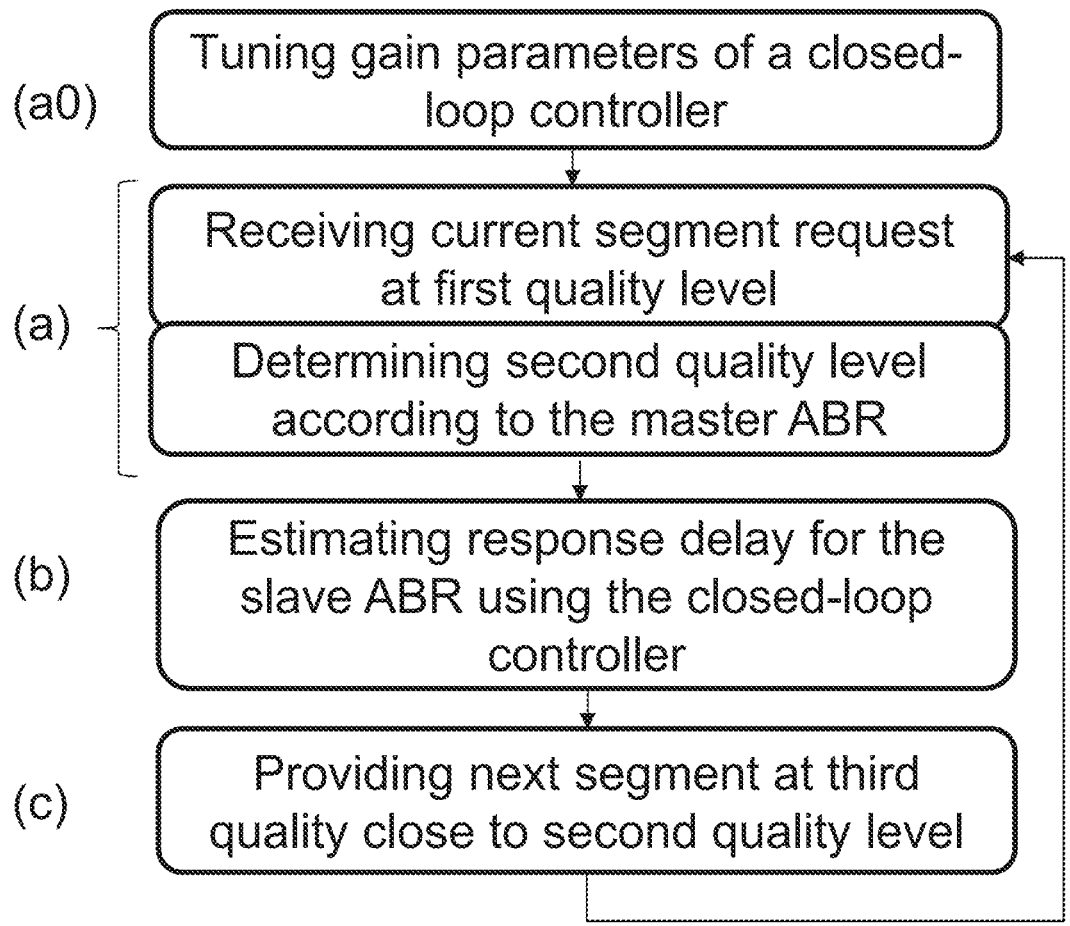
FIG. 3 illustrates a preferred embodiment of the method according to the invention.

As illustrated by FIG. 3, the method then begins with the implementation by the processing means 110 of the device 11 of a step (a) of receiving a request for a segment (referred to as "current segment"), in practice the next segment to be put in the second buffer memory M2 (not necessarily the next segment to played, there are normally several segments buffered in advance). Said request is received from the player, and defines the quality level which is required for the requested segment, i.e. the bitrate (by applying the ABR logic), referred to as "first quality level" as explained.

It is assumed that said segment is at least partially available at this stage (i.e. at least a fragment) in the first buffer M1, in the first quality required by the player. If this segment/segment fragment was in another quality, it would have to be retrieved again, generally directly from the content server 2 because we are running out of time.

Step (a) includes, if necessary, the "measurement" of said at least one parameter representative of a segment reception rate, and/or in a preferred embodiment, a parameter representative of a capacity of said peer-to-peer network 10. Note that the bandwidth as parameter representative of a segment reception rate may be smoothed (EWMA or any other methods) to help in smoothing the quality transitions.

By "parameter representative of a capacity of said peer-to-peer network 10", it is meant any P2P metric that may be of interest to the skilled person for evaluating the efficiency of the peer-to-peer network 10 and its ability to accept (or not) a higher bitrate, see below the embodiment "overriding the existing ABR logic".

In a following step (b), the closed loop controller is used to determine the optimal response delay for providing the requested current segment. Because said closed loop controllers minimize the difference between said first quality level and the setpoint second quality level, the optimal response delay allows the quality level to tend towards the second quality level. In others words, as explained, said optimal response delay is such that providing the requested current segment at the expiration of said optimal response delay will cause the player to flawlessly request according to its ABR logic a next segment at a third quality level close (and even as close as possible) to said second quality level.

Note that the first, second, and third quality levels may be same quality levels (thus the closed loop controller simply stabilizes the quality level).

In the case where it is only a fragment of the requested segment which has been retrieved from the P2P network (it is said that the segment is available in an incomplete manner), preferably the estimated optimal response delay is modified according to the length of the fragment so as to reflect the fact that only a fragment of the optimal response delay should actually be applied. Indeed, the second buffer M2 can only be provided with complete segments and not fragments, and the idea is to provide the segment in full after a shorter response delay reflecting the fact that there will already be an implicit waiting delay corresponding to the time to complete (finish retrieving) this segment in the first buffer M1. Thus, step (b) may include modifying the estimated optimal response delay as a function of an estimated duration necessary to finish retrieving the segment.

For example, we could apply the formula dm'=max(0, dm−tdwm), where dm' is the modified optimal response delay and tdwm is the estimated time needed to finish retrieving the segment. So, waiting for time tdwm plus applying dm' before delivering the full segment is equivalent to applying dm, so the overall delay remains the same.

Then, in the step (c) the current segment (segment m) is provided in response to the request, from the first buffer M1, at the expiration of said estimated optimal response delay.

By "provided at the expiration of said response time" is meant so that the player does not have it before the expiration of the response delay (at best at the time of expiration, or even only after in some cases, see below). Most often, the segment is transmitted suddenly when the response delay expires, but it will be understood that it is quite possible to "stream" it within device 11, i.e. to transmit it from the first buffer M1 gradually (piece after piece) so that the last piece is transmitted (at the earliest) when the optimal response delay expires (the optimal response delay is then a "transmission time of the last bit of the segment"). Indeed, although only complete segments are playable, some players can accept sub-segments of the segment. Note that such a progressive transmission does not change anything since as long as the segment is not fully received it is not available by the player and therefore not considered to be provided, but makes it possible to facilitate bandwidth measurements.

In the case where only a fragment of the segment was available in the first buffer M1 and the response time has been modified according to an estimated duration necessary to finish recovering the segment, normally the segment is also supplied to the step (c) at the end of the modified response time. As explained, although the supply can be fragmented, one should not confuse sub-segments of a complete segment (which correspond to consecutive pieces of segment obtained from a completely downloaded segment) and an incomplete segment (in which only certain parts of the data, most often corresponding to disparate pieces, have been downloaded). Only a segment completely available in the first buffer M1 can be provided (progressively if necessary) in response to the request (and not a fragment), so that if the download takes longer than expected, the segment may not be fully available until after the modified response delay has expired. Thus, as explained the complete segment is provided at the earliest at the expiration of the modified optimal response delay (i.e. not before), but possibly after. In practice, the complete segment is provided when the following two conditions are satisfied: the segment is completely available (its download is complete), and the modified optimal response delay has expired.

In all cases, the segment is preferably provided to the second buffer M2, and as such step (c) can comprise the conversion into a format suitable for playing said segment. This consists in transforming the raw segment into a converted segment, which can be read by the player of the device 11, unlike the raw one.

For example, if the player is the built-in player of an HTML5 compatible browser, the conversion consists of injecting the segment's video data using the Media Source Extension API of the browser Naturally, step (c) advantageously comprises simultaneously playing a previous segment (for instance segment m−1, but possibly an even older segment) stored in the second buffer memory M2, so that the segments need to be renewed. The segment retrieved in step (d) will soon be read in turn.

We can now repeat steps (a) to (c) as long as the playing lasts: the next segment is now the new current segment, and said closed loop controller being continuously working.

In other words, a new occurrence of step (a) consists in receiving from the player a request for the next segment at the third quality level (we remind that the third quality level is the real requested level and not a prediction). The closed loop controller continues minimizing a difference between said third quality level and the setpoint second quality level (note it may have dynamically changed since last segment).

Overriding the Existing ABR Logic

The setpoint second quality level may be predefined or set by the user, possibly dynamically.

Alternatively, in a preferred embodiment, the existing ABR logic of the player is overridden with a new ABR logic, that will be referred to as "master" ABR logic, this time optimized towards P2P mechanisms, integrated outside the player, as proposed in the application EP20306545. The master ABR logic can thus be coined as "P2P-friendly" ABR logic, by contrast with the existing ABR logic of the player (that will be referred to as "slave" ABR logic) which is not aware of the P2P network 10.

In other words, this strategy implements a two-stage master/slave ABR logic wherein the master ABR is the P2P-friendly one and the slave ABR is the existing one. To rephrase again, instead of "altering" the existing ABR logic (that would be impossible because as explained this ABR algorithm is embedded within the player), the principle of the present invention is to control this existing ABR to follow another master ABR strategy further based on at least one P2P metric.

The master ABR logic actually takes the ABR decisions (taking into account the P2P context), such decisions being applied by luring the slave ABR logic into taking the same ABR decisions. The existing ABR logic of the player does not know that there is a "masterminding" ABR logic.

In such an embodiment, step (a) comprises determining the second quality level as a function of said at least one parameter representative of an efficiency of said peer-to-peer network 10, and preferably also as a function of said parameter representative of a segment reception rate. In other words, said second quality level (to be applied) is determined according to the master ABR logic.

Here, any strategy may be used for the master ABR logic, as long as it takes into account the efficiency of said peer-to-peer network 10 when taking a decision. As already explained, it is to be understood that the P2P-friendly ABR is just a generalization of the principle of an ABR to allow the automatic variation of the quality of the recovered segments according not only to the capacities of a peer but also to the capacities of the whole P2P network While known ABR logics (including said slave ABR logic) automatically determine the best quality that can be chosen in view of said at least one parameter representative of a segment reception rate, the present master ABR logic automatically determines the best quality that can be chosen in view of said at least one parameter representative of a capacity of said peer-to-peer network 10 (and preferably also in view of said parameter representative of a segment reception rate).

In particular, this master ABR logic can be designed as an extension of an existing ABR logic, with further rules about the P2P network 10 behavior. For instance, the master ABR logic may allow an increase of the quality level (proposed on the basis of the parameter representative of a segment reception rate) if there is enough availability of the segments in the higher quality levels, and else keep the current quality level.

Pre-Fetching

As proposed in the application EP20315054, the present method may comprise (before step (c), i.e. typically during the response delay), if said next segment (segment m+1) is not present at said third quality level in the first buffer M1), fetching it from the network 1 (i.e. performing "pre-fetching", as we are at least one segment ahead). Note that the third quality level is not yet known but could be determined from the optimal response delay thanks to the above-mentioned model predicting the ABR logic (ML-model). To rephrase, the closed loop controller determines the optimal response delay for getting as close as possible to the second quality level, and the ML model predict from this response delay the third quality level that will be effectively reached.

In other words, while the next segment should have been normally fetched at the first quality level (which is still the current quality), here the switch to the third quality level is anticipated, so as to save bandwidth. Indeed, if the segment was fetched at the first quality level, the first buffer M1 would have to discard it if the third quality level was different from the first quality level. As the third quality level is taken into account in advance, bandwidth is saved.

By "fetching", it is meant obtaining said segment from the network 1, by download to the P2P cache M1 from at least one another peer 12 of the P2P network 10 and/or from the content server 2 (CDN), as it explained in the application EP20315054. Note that said next segment may actually have already been entirely downloaded, in particular if the third quality level is the same as the first quality level, so that no further action is necessary.

It is of course preferred to pre-fetch from the P2P network 10, but it may be enabled to pre-fetch from the CDN 2:

If a big part of the segment can be obtained from P2P network 10 in time (before the expiration of the response delay), then the CDN can be used to download the small part left.

If the CDN is slower than P2P, but the peers do not have all segments, the missing segments can be scheduled very early to get them from CDN and get the rest from peers.

If peers have the next segments on a higher quality level than the available one, but some segments (or parts of the next segments) are missing, the CDN can be used to fetch the missing data.

Device and Computer Program Product

According to a second aspect, the invention concerns the device 11 for performing the previous described method for playing a content (streamed in a peer-to-peer network 10 of client devices 11, 12) on a player of the device 11 configured so as to choose the quality level of the segments as a function of at least one parameter representative of a segment reception rate, according to an ABR logic of the player.

This device 11 comprises as explained:
a first buffer M1 (P2P cache) for storing segments in a format adapted for transferring within the peer-to-peer network 10;
Preferably a second buffer M2 (video buffer) for storing segments in a format adapted for being played by the player;
a processing unit 110.

The processing unit 110, typically a processor, is implementing the following steps:
(a) receiving from the player a request for a current segment at a first quality level;
(b) determining, using a closed loop controller minimizing a difference between said first quality level and a setpoint second quality level, an optimal response delay for providing the requested current segment.
(c) providing the requested current segment from the first buffer (M1) at the expiration of said estimated optimal response delay In a third and fourth aspect, the invention concerns a computer program product comprising code instructions to execute a method (particularly on the data processing unit 110 of the device 11) according to the first aspect of the invention for playing on a player of a client device 11 a content streamed in a peer-to-peer network 10 of client devices 11, 12, and storage means readable by computer equipment (memory of the device 11) provided with this computer program product.

The invention claimed is:

1. A method for playing on a player of a client device a content streamed in a network, said content consisting of a sequence of segments available in a plurality of quality levels, the player being configured so as to choose the quality level of the segments as a function of at least one parameter representative of a segment reception rate, according to an Adaptive Bit Rate, (ABR), logic of the player; the client device comprising a first buffer (M1) for storing segments in a format adapted for transferring within the network, the method being characterized in that it comprises performing by a processing unit of the client device:
(a) receiving from the player a request for a current segment at a first quality level;
(b) determining, using a closed loop controller that minimizes a difference between said first quality level and a setpoint second quality level, an optimal response delay for providing the requested current segment;
(c) providing the requested current segment from the first buffer (M1) at the expiration of said estimated optimal response delay, wherein
said ABR logic of the player is defined by a first function of said at least one parameter representative of a segment reception rate,
the segment reception rate is based on at least a capacity of the client device and/or network,
the network comprises a peer-to-peer network of client devices, and
a parameter representative of a capacity of said peer-to-peer network is chosen among a transfer speed of the peer-to-peer network, a segment availability, a rate of segment fetching, and a stability of the client devices.

2. A method according to claim 1, wherein the client device further comprises a second buffer (M2) for storing segments in a format adapted for being played by the player, said current segment being provided at step (c) to said second buffer (M2).

3. A method according to claim 2, wherein said parameter representative of a segment reception rate is chosen among a buffer level of the first buffer (M1) and/or of the second buffer (M2) and a bandwidth.

4. A method according to claim 1, wherein said closed-loop controller presents a plurality of gain parameters, the method comprising a previous step (a0) of tuning said gain parameters.

5. A method according to claim 1, wherein said closed-loop controller is a proportional—integral—derivative controller having three gain parameters.

6. A method according to claim 1, step (a) comprising determining, as a function of the parameter representative of the capacity of said peer-to-peer network, said second quality level.

7. A method according to claim 1, wherein said method is iteratively performed for said sequence of segments, said closed loop controller being continuously working.

8. A method according to claim 1, wherein said optimal response delay is such that providing the requested current segment at the expiration of said optimal response delay will cause the player to flawlessly request according to its ABR logic a next segment at a third quality level close to said second quality level.

9. A method according to claim 8, comprising before step (c), if said next segment is not present at said third quality level in the first buffer (M1), fetching said next segment at said third quality level from the network.

10. A device for playing on a player a content streamed in a network, said content consisting of a sequence of segments available in a plurality of quality levels, the player being configured so as to choose the quality level of the segments as a function of at least one parameter representative of a segment reception rate, according to an Adaptive BitRate, (ABR), logic of the player;
the client device comprising a first buffer (M1) for storing segments in a format adapted for transferring within the network, the client device being characterized in that it comprises a processing unit implementing:
(a) receiving from the player a request for a current segment at a first quality level;
(b) determining, using a closed loop controller minimizing a difference between said first quality level and a setpoint second quality level, an optimal response delay for providing the requested current segment;
(c) providing the requested current segment from the first buffer (M1) at the expiration of said estimated optimal response delay, wherein said ABR logic of the player is defined by a first function of said at least one parameter representative of a segment reception rate, the segment reception rate is based on at least a capacity of the client device and/or network, the network comprises a peer-to-peer network of client devices, and a parameter representative of a capacity of said peer-to-peer network is chosen among a transfer speed of the peer-to-peer network, a segment availability, a rate of segment fetching, and a stability of the client devices.

11. Computer program product comprising code instructions to execute a method according to claim 1 for playing on a player of a client device a content streamed in a network, when said program is executed on a computer.

12. A non-transitory computer-readable medium, on which is stored a computer program product comprising code instructions for executing a method according to claim 1 for playing on a player of a client device a content streamed in a network.

* * * * *